(12) United States Patent
Kodai

(10) Patent No.: US 6,748,721 B2
(45) Date of Patent: Jun. 15, 2004

(54) THERMOFORMING METHOD FOR FILM ON BLISTER PACKING MACHINES AND APPARATUS FOR IT

(75) Inventor: Takeshi Kodai, Hannan (JP)

(73) Assignee: Mutual Corporation, Osaka (JP)

( * ) Notice: Subject to any disclaimer, the term of this patent is extended or adjusted under 35 U.S.C. 154(b) by 0 days.

(21) Appl. No.: 10/231,092

(22) Filed: Aug. 30, 2002

(65) Prior Publication Data

US 2003/0051443 A1 Mar. 20, 2003

(30) Foreign Application Priority Data

Sep. 19, 2001 (JP) ........................................ 2001-285384

(51) Int. Cl.$^7$ ............................................. B65B 47/00
(52) U.S. Cl. ............................. 53/453; 53/427; 53/559; 53/454; 53/560
(58) Field of Search .......................... 53/453, 427, 559, 53/454, 560

(56) References Cited

U.S. PATENT DOCUMENTS

| | | | | |
|---|---|---|---|---|
| 3,427,687 A | * | 2/1969 | Miller ........................ 425/195 |
| 4,275,544 A | * | 6/1981 | Hisazumi et al. ............. 53/433 |
| 4,506,495 A | * | 3/1985 | Romagnoli .................. 53/559 |
| 4,909,722 A | * | 3/1990 | Wakayama et al. ......... 425/384 |
| 4,918,907 A | * | 4/1990 | Roach et al. ................. 53/453 |
| 5,203,455 A | * | 4/1993 | Hewelt et al. .............. 206/704 |
| 5,343,672 A | * | 9/1994 | Kearney et al. .............. 53/440 |
| 5,522,505 A | * | 6/1996 | Giovannone ................ 206/462 |
| 6,079,189 A | * | 6/2000 | Sloot .......................... 53/453 |
| 6,219,997 B1 | * | 4/2001 | Friberg et al. ............... 53/453 |

* cited by examiner

Primary Examiner—Rinaldi I. Rada
Assistant Examiner—Brian Nash
(74) Attorney, Agent, or Firm—Wenderoth, Lind & Ponack, L.L.P.

(57) ABSTRACT

The present provides a thermoforming system for film on blister packing machines that forms pockets without any extreme reduction of thickness of the sheet at the top face portion of the pocket and enables sheets to be placed one upon another without warping. The thermoforming system for film for blister packaging machines pinches and heats a film, fed intermittently in synchronization with an open/close drive of a pair of dies on a thermoforming system, between the dies of the thermoforming system, and partially extends the heated film along an inner circumferential face of the pocket holes of the forming die to form pockets. The dies of the thermoforming system are constructed with a forming die provided with pocket holes, a heating die provided with a plugs for locally heating only the pocket forming portion of the film F disposed facing the pocket holes of the forming die, and injecting mechanisms that inject compressed air disposed on the forming die side and the heating die side, respectively.

17 Claims, 8 Drawing Sheets

THERMOFORMING METHOD FOR FILM ON BLISTER PACKING MACHINES AND APPARATUS FOR IT

BACKGROUND OF THE INVENTION

The present invention relates to an apparatus and thermoforming method for film on blister packing machines and, more specifically, to an apparatus and thermoforming method for film on blister packing machines, realized in such a way as to be capable of preventing warping of a blister sheet, when performing blister packaging by using a polypropylene film which is disposable by burning, and forming a film with a largest possible thickness at the portion of the film forming depressions (hereinafter referred to as "pockets").

Conventionally, in blister packaging for packaging tablets such as chemicals, etc. by using film such as PVC film, etc., the normal practice consists of heating a long film fed intermittently and continually as desired by pinching it between flat-shaped hot plates disposed face to face and movable in approaching and separating directions. In this heated and softened film, pockets are formed in which to house one or several pieces of tablets each by means of a forming die. The tablets are then fed into the respective pockets and the pockets are sealed by placing aluminum foil along the film having such pockets. The film is then cut so that the required number of pockets may be contained in one piece of sheet, as products.

The forming of film on the conventional blister packaging machines is generally made by unwinding film continuously or intermittently from a roll which took up PVC film in the shape of a tape. The entire face of the film is heated to a temperature suitable for forming pockets, by means of a heating unit, disposed in such a way as to face both faces of the film in linkage with the unwinding of the film, wherein the heating unit moves in approaching and separating directions against the film. The film is then fed to the forming system which forms part of the film into pockets of a required shape from a forming die disposed on one side of the forming system. After filling tablets into these pockets, the pockets are sealed by attaching aluminum foil thereto.

However, there was a problem that, while PVC film is suitable for forming part of a heated film into pockets of a required shape, the film thickness of the formed pockets, especially at the top face portion of the pockets, becomes extremely small compared with other parts of the film. This occurs because the pockets are formed by heating the entire face of the PVC film, and therefore, the pockets are easily deformed at the time of packaging the tablets, after filling the pockets with tablets, made by placing two sheets one upon another with their pockets facing each other and in opposite directions, or in the course of distribution or sale.

Moreover, when the PVC film in which pockets are formed is cut into sheets as blister sheets, the surrounding portion remaining after cutting in the shape of a sheet becomes scraps. The products and the scraps are taken out separately, and only the scraps are disposed of. However, the scraps, which produce a high temperature when burning that may damage an incinerator, have been disposed in landfills, etc. in recent years, thereby involving high scrap treating costs. To avoid this problem, the blister sheet has come to be formed by using polypropylene which can be burned in an ordinary refuse incinerator.

The polypropylene film sheet, like PVC film sheet, has a problem of becoming extremely thin at the formed pockets, especially at the position of the sheet forming the top face portion of the pockets, compared with other portions of the film, thereby making the pockets easily deformable after filling the pockets with tablets. Another problem is that, when the film is heated on the entire face when forming the pockets, the blister sheet after filling the pockets with tablets is warped because of a difference in coefficient of heat contraction between the polypropylene film sheet and the aluminum foil. This makes it impossible, when performing packaging of tablets by placing sheets one upon another with their pockets facing each other, to place the sheets one upon another automatically with a machine. Instead, the operation must be executed manually, thereby leading to poor working efficiency.

SUMMARY OF THE INVENTION

The objective of the present invention, realized in view of the problems produced when forming pockets by heating the film using the conventional blister packaging machine, is to provide an apparatus and thermoforming method for film on blister packing machines, realized in such a way as to form pockets without an extreme reduction in the thickness of the sheet at the top face portion of the pockets, and to enable sheets to be placed one upon another without warping.

To achieve this objective, the thermoforming method for film on blister packaging machines according to the present invention is characterized in that it consists of the pinching of a film, fed intermittently in synchronization with an open/close drive of the die on a thermoforming system, between the dies of the thermoforming system. Only the pocket forming portion of the film is locally heated by pressing the pocket forming portion into contact with the surface of hot plugs which face the pocket holes of the forming die. By injecting compressed air from a forming die side, stopping the injection of compressed air from the forming die side, and then injecting compressed air from a heating die side, the heated portion of the film is able to extend along the inner circumferential face of the pocket holes of the forming die to thereby form pockets.

This thermoforming method for film on blister packaging machines, realized in such a way as to heat only the pocket forming portion of the film locally and extend the heated portion of the film along the inner circumferential face of the pocket holes of the forming die to form pockets, is capable of forming blister sheets without warping, even when using polypropylene film, which is liable to be easily deformed due to thermal contraction because the portions of the film not forming pockets are not heated. The present invention is also capable of performing lap packaging of blister sheets by using an automatic machine and forming pockets without reducing the thickness of the sheet at the top face of the pockets, thus preventing deformation at the top face of the pockets after filling the pockets with tablets.

In this case, it may be so arranged that the plugs retreat when the heated portion of the film is extended along the inner circumferential face of the pocket holes of the forming die.

This makes it possible for the heated and softened film to separate accurately from the plugs of the heating die. The compressed air injected in this state acts uniformly on the film face, to accurately extend the heated portion of the film along the inner circumferential face of the pocket holes of the forming die and accurately form pockets.

Moreover, to achieve the same objective, the thermoforming system of film for blister packaging machines according to the present invention is a thermoforming system for film on blister packaging machines, realized in such a way as to pinch and heat the film, fed intermittently in synchronization with an open/close drive of the die on a thermoforming system, between the dies of the thermoforming system. The heated film is partially extended along the inner circumferential face of the pocket holes of a forming die to form pockets in the film. The dies of the thermoforming system are constructed with the forming die provided with pocket holes, and a heating die provided with plugs to locally heat only the pocket forming portion of the film disposed facing the pocket holes of the forming die. Injecting mechanisms which inject compressed air are disposed on the forming die side and the heating die side, respectively.

This thermoforming system for film on blister packaging machines, in which injecting mechanisms of compressed air on the forming die side and the heating die side are disposed respectively, is capable of heating only the pocket forming portion of the film locally and forming pockets by extending the heated portion of the film along the inner circumferential face of the pocket holes of the forming die. Therefore, blister sheets can be formed without warping, even when using polypropylene film which is liable to be easily deformed by thermal contraction, because the portions not formed into pockets are not heated. The thermoforming system according to the present invention can also perform lap packaging of blister sheets by using an automatic machine and form pockets without thickness reduction of the sheet at the top face of the pockets, thus preventing deformation at the top face of the pockets after filling the pockets with tablets.

The thermoforming system is constructed with a heating die and a forming die, so that the open/close operation of the heating die and forming die is performed in synchronization with the intermittent feeding of the film, and it is so arranged that the heated film is pressed by compressed air pressure in such a way as to lie along the pocket holes, thereby enabling the easy and accurate formation of pockets.

In this case, a compressed air injection hole may be formed at the inner bottom of the pocket holes of the forming die.

This makes it possible to heat the film by uniformly pressing it in contact with the plugs provided on the heating die from the forming die side, and form pockets of good accuracy in a beautiful shape.

Furthermore, it may be so arranged as to inject compressed air through the plug insertion holes in the heating die, and construct the heating die in the form of a water cooled jacket.

This makes it possible to clearly distinguish between the heated and non-heated heated portions of the film and form blister sheets without warping, because the non-heated portion is cooled even if the heated portion is heated to such an extent as to cause softening of the film.

BRIEF DESCRIPTION OF THE DRAWINGS

FIG. 4 indicates a heating device, (A) being a front elevation, (B) a side view, and (C) a sectional view.

FIG. 7 indicates a forming die, (A) being a front elevation, (B) a side view, and (C) a sectional view.

DETAILED DESCRIPTION OF THE INVENTION

The thermoforming method for film on blister packaging machines according to the present invention and an embodiment of the apparatus for carrying out the method will be explained hereafter based on the drawings.

Figure 1:
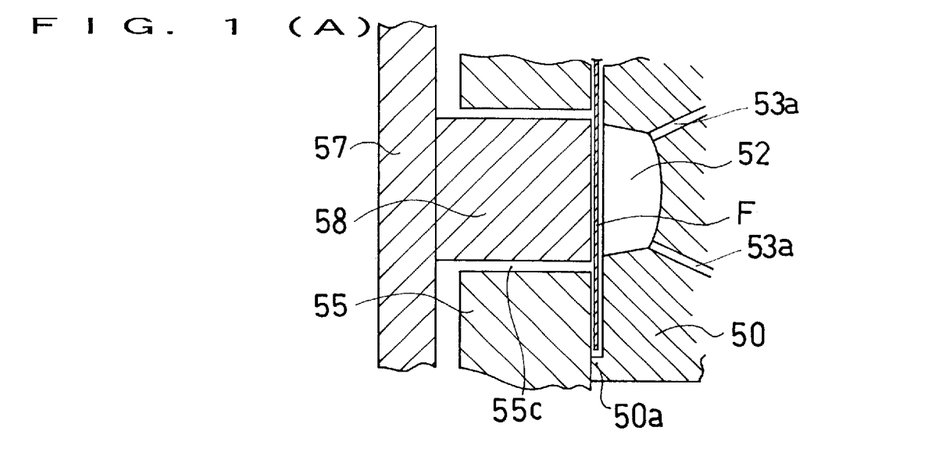
FIG. 1 is an explanatory drawing showing the process of thermoforming method for film on blister packaging machines according to the present invention, (A) being a sectional view showing the state in which a film is fed between the dies of the thermoforming system, (B) a sectional view showing the state in which the film is pressed to the heating side with compressed air from the forming die side, and (C) a sectional view showing the state in which the film is press formed by compressed air to the forming side, respectively.

FIG. 1 shows the process of a thermoforming method for film on blister packaging machines according to the present invention, while FIG. 2 to FIG. 8 show an embodiment of the thermoforming system on blister packaging machines according to the present invention.

Figure 8:
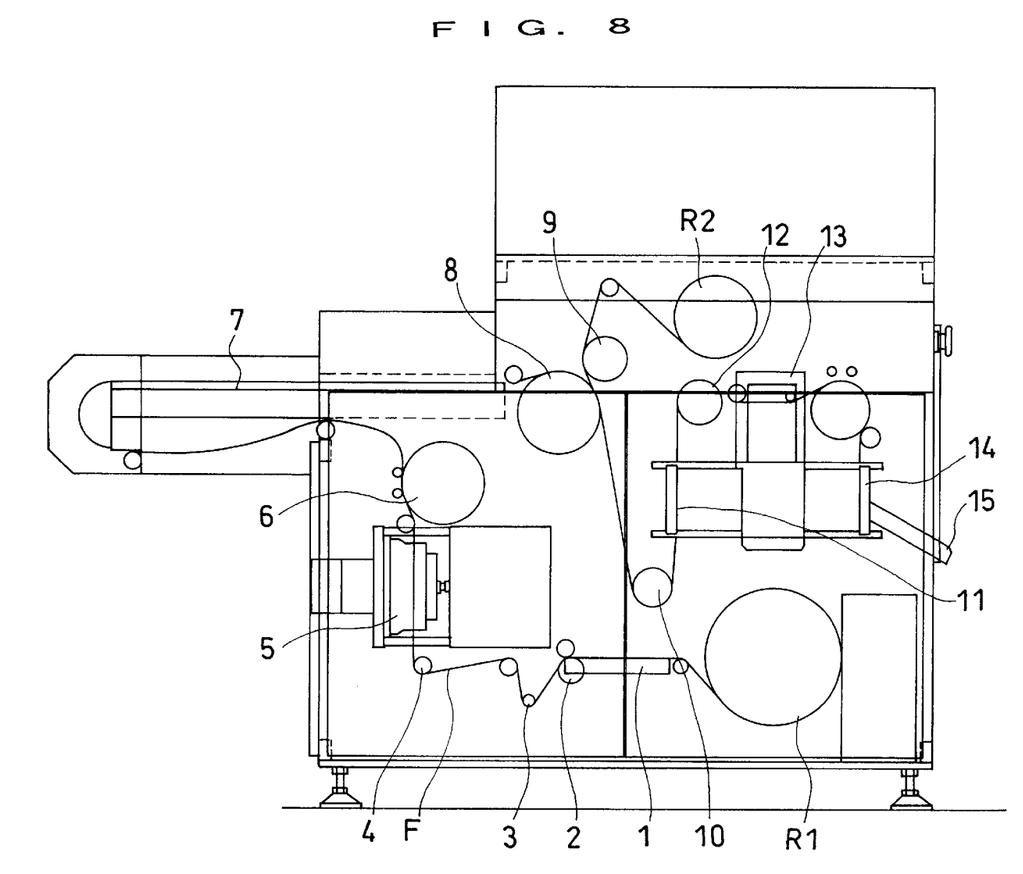
FIG. 8 is a front elevation of a blister packaging machine to which is applied the thermoforming method of film according to the present invention.

The blister packaging machine according to the present invention is constructed in such a way that, as shown in FIG. 8, the polypropylene film F fed sequentially from the roll film R1 containing the film F is delivered by the feed roller 2 through the film connecting stand 1. After adjustment of tension, etc. by the fixed tension roll 3, the film F is fed intermittently by the guide roller 4 to the subsequent thermoforming system 5. After forming required pockets in the film F, the film F is sent from the forming feed roller 6 to the film guide rail 7. After tablets are fed into the respective pockets of the film F from a tablet feed system (not illustrated) on the film guide rail 7, the pockets are sealed with the aluminum foil Al which is supplied sequentially from the aluminum foil roll R2 containing the aluminum foil and seal rolls 8, 9. The film F passes through the dancer roll 10, the slitter 11 and the guide roller 12, is marked with the marking device 13, punched with the punching die set 14 and, after separation between the products in the form of sheet and scraps, the products in the form of sheets are taken out through the discharge chute 15.

Figure 2:
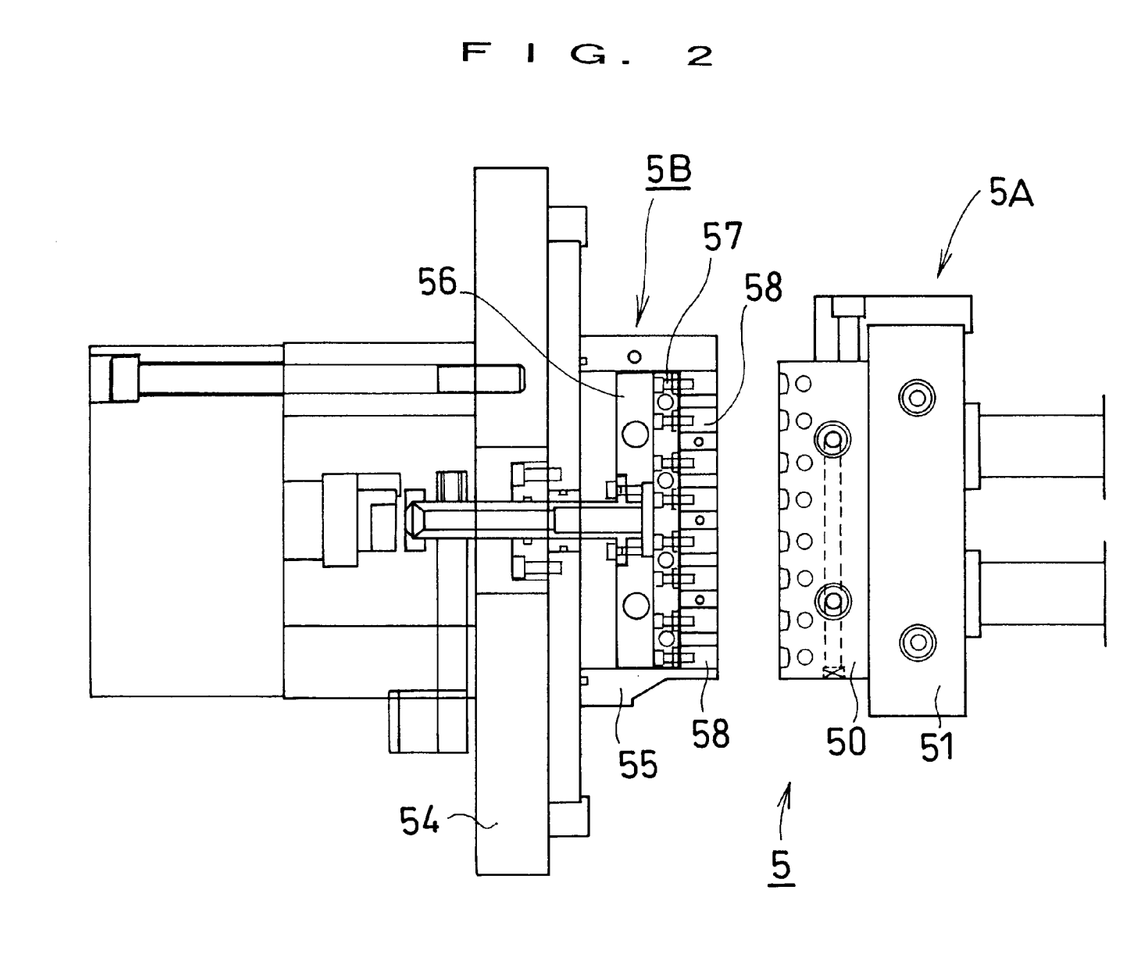
FIG. 2 is a front elevation of the thermoforming system for film on blister packaging machines according to the present invention.
Figure 3:
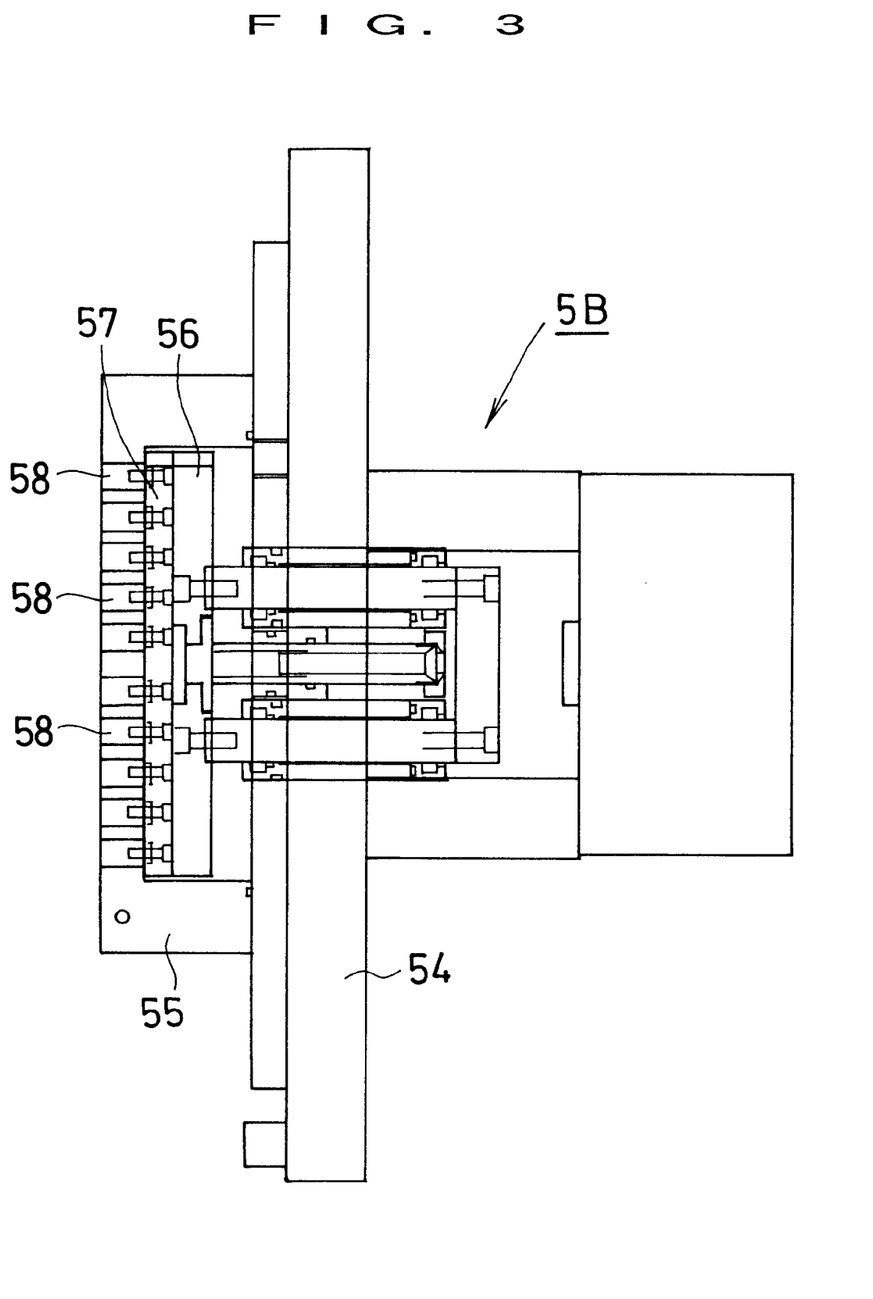
FIG. 3 is a side view for above.

This thermoforming system 5 is constructed by providing a forming die 5A and a heating die 5B face to face and movable in the approaching and separating directions, as shown in FIG. 2, to pass the continuous sheet-like film F through the space between the forming die 5A and heating die 5B, synchronizing intermittent feed of the film F with the approaching and separating motions of the forming die 5A and heating die 5B.

It is so arranged that the continuous sheet-like film F moves upward nearly vertically from below through the space between the forming die 5A and heating die 5B facing each other.

Figure 7A:
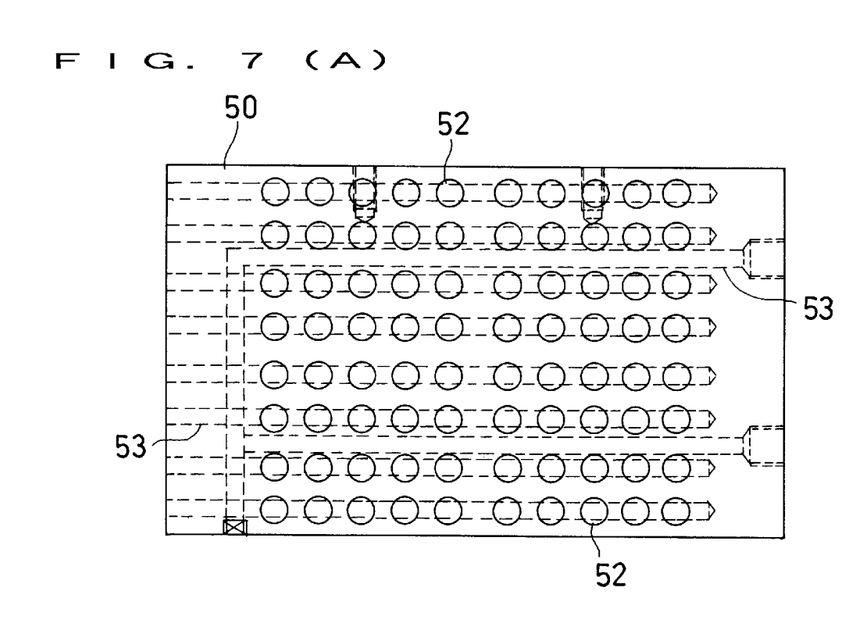
Figure 7B:
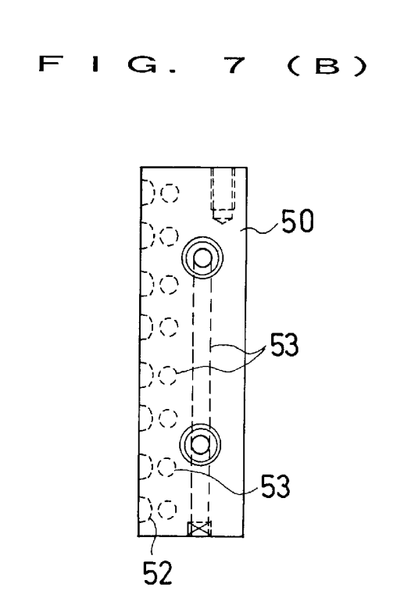
Figure 7C:
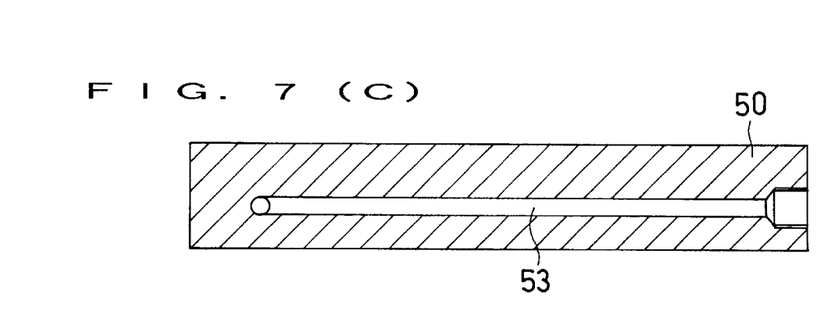

The forming die 5A is constructed, as shown in FIG. 2 and FIG. 7. by installing a forming die body 50 on a mounting base 51 provided movable in the approaching and separating directions, against the heating die 5B facing the forming die 5A. The forming die body 50 is constructed by forming, on its surface, a plurality of depressed pocket holes 52 in lines, to form a plurality of sheets forming 10–12 pockets at a time, or 8 sheets as in the illustrated embodiment, though not particularly restricted to this number, so that a plurality of tablets, or 10–12 tablets, for example, though not particularly restricted to this number, and forming compressed air supply routes 53 so as to supply pressure controlled compressed air into the respective pocket holes 52 through compressed air injection holes 53a.

The shape of these pocket holes 52 is not particularly restricted to the illustrated shape, but the compressed air supply routes 53, formed in a way to communicate with the respective pocket holes 52 through compressed air injection holes 53a, are connected to a compressed air source (not illustrated), so that compressed air may be fed synchronously into a plurality of pocket holes 52.

Moreover, the heating die 5B on the other side faces the forming die 5A, as shown in FIG. 2 to FIG. 6, and is usually fixed, but it may also be made movable in the approaching and separating directions, against the forming die 5A facing it.

Furthermore, the forming die 5A and the heating die 5B facing each other, which are fixed in vertical direction while being movable in the approaching and separating directions, may also be made movable in a vertical direction in synchronization with the intermittent feed of the film, to improve productivity by accelerating the feed speed of the film to be heated.

Figure 4:
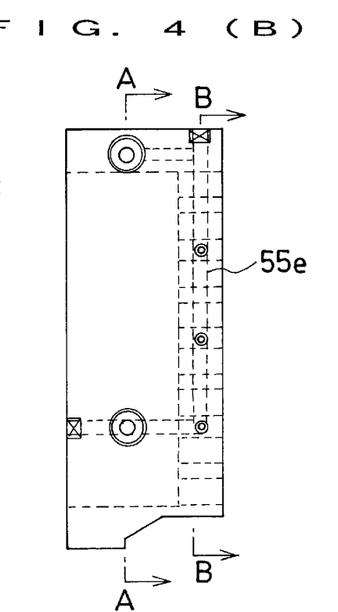
Figure 5:
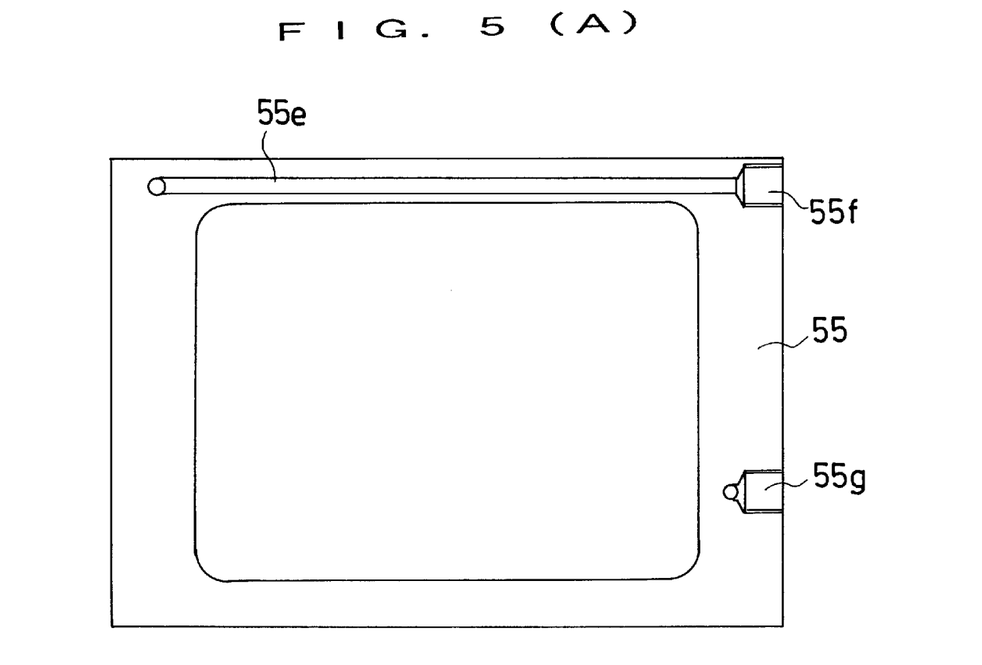
FIG. 5 is a section view of the heating device indicated in FIG. 4.

The heating die 5B is constructed by fixing a heating die body 55 to a mounting base 54 through a mounting tool such as bolts, etc., mounting, on the heating die body 55, a heater base 56 and a plug mounting board 57, and providing, on the plug mounting board 57, a plurality of plugs 58 which project in such a way as to face the pocket holes 52 formed on the forming die 5A.

The heating die body 55 is constructed, as shown in FIG. 4 and FIG. 5, by forming, on the back face side (55a) of the heating die body 55, a depression 55b hollowed in the heating die body 55. On the back face side 55a, a plurality of plug insertion holes 55c are formed in such a way as to face the pocket holes 52 formed on the forming die 5A. At one end side of the heating die body 55, a cooling water feed port 55f and a drain port 55g are formed. To connect between the cooling water feed port 55f and the drain port 55g, a water channel 55e in the shape of a tunnel is formed, though not particularly restricted to this shape, so that the supplied cooling water may circulate through the heating die body 55 to cool the entire part of the heating die body 55.

On the outer circumferential face on the back face side of the heating die body 55 is formed a ring-shaped groove 55d, to ensure accurate installation on the mounting base.

Figure 6:
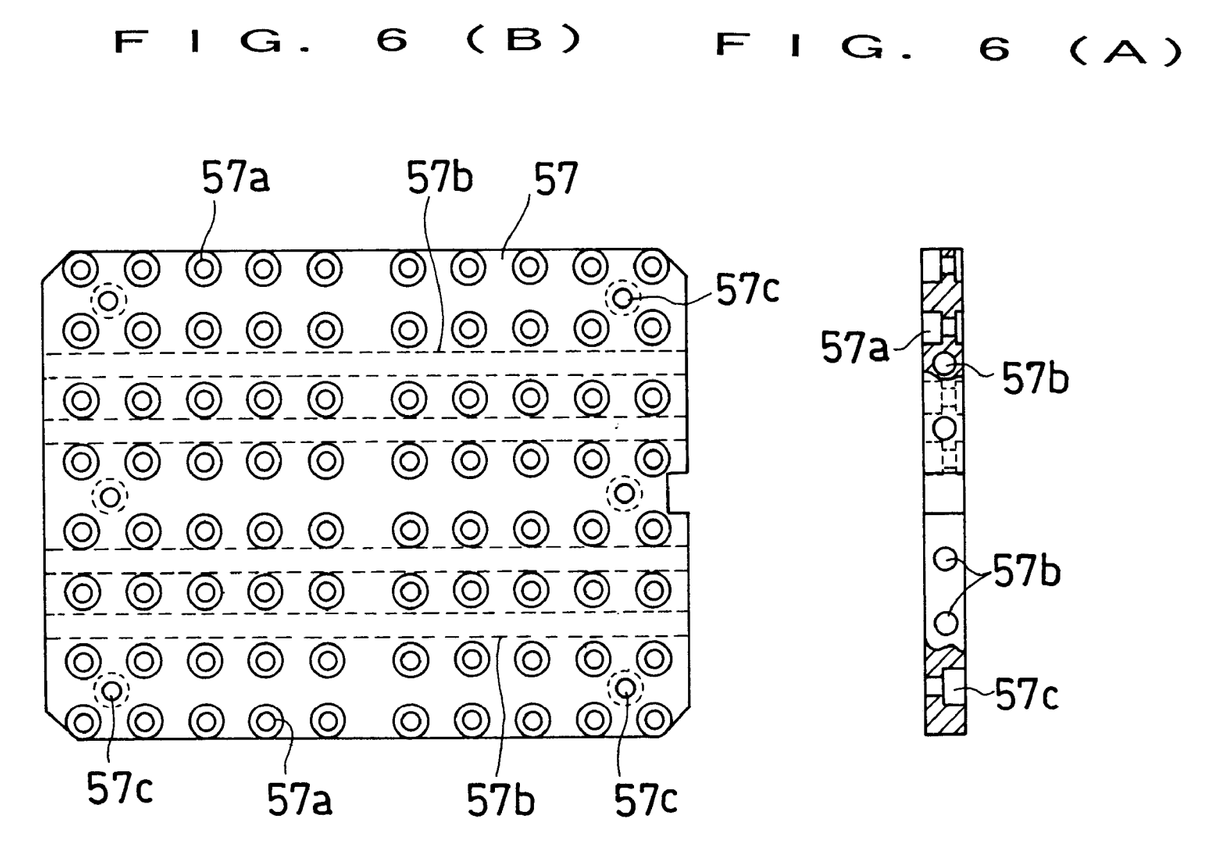
FIG. 6 indicates the plug base of the heating device, (A) being a front elevation, and (B) a partially broken side view.

The plug mounting board 57, which is a thick plate to be inserted in the depression 55b of the heating die body 55, is constructed by forming, as shown in FIG. 6, mounting holes 57c, to thereby be fixed to the heating die body 55 by means of bolts or screws. On the plug mounting board 57, plug mounting holes 57a are formed at the same position as that of the plurality of plug insertion holes 55c in such a way as to face the pocket holes 52 formed on the forming die 5A, and a plurality of heater insertion holes 57b are formed inside the plug mounting board passing in either transversal or vertical directions.

A pipe-shaped heater is inserted in the heater insertion holes 57b, and plugs 58 are fixed to the plug mounting hole 57a by screwing, etc., so that a plurality of plugs 58 may be installed in lines so as to project from the surface of the plug mounting board 57.

It is so arranged that, when the plug mounting board 57 on which the plugs 58 are disposed is inserted in the depression 55b of the heating die body 55, the respective plugs 58 are inserted in the plug insertion holes 55c. In this case, the tip face of the plugs 58 becomes nearly flush with the surface of the heating die body 55, and a clearance is formed between the outer circumferential face of the plugs 58 and the inner circumferential face of the plug insertion holes 55c, so that the compressed air for forming may be injected through this gap into the pocket holes 52 of the forming die 5A.

Next, explanation will be given on the method of forming pockets in a film by using the thermoforming system of film for a blister packaging machine.

As shown in FIG. 8, the film F wound on roll film R1 is delivered from the roll film R1 through a film connecting base 1, sequentially and intermittently, by a delivery roller 2, in synchronization with the open/close drive of the thermoforming system 5. At that time, the tension of the film is adjusted by a constant-tension roll 3 and, as a preset length of film is introduced, through a guide roller 4, between the forming die 5A and the heating die 5B of the thermoforming system 5 facing each other in such a way as to separate, the delivery stops, and the separated forming die 5A and heating die 5B are closed.

At this time, the film F is pinched at the outer circumference between the separated forming die 5A and the heating die 5B. However, since the clearance between the separated forming die 5A and the heating die 5B is set larger than the thickness of film, as shown in FIG. 1, the film F can move freely over a certain small distance in the direction of thickness, between the forming die 5A and the heating die 5B. If the forming die 5A and the heating die 5B are closed, the compressed air supplied from the compressed air supply routes 53 on the forming die 5A side is injected from the respective pocket holes 52, through the compressed air injection holes 53a, to press the film F against the forming face of the heating die 5B on the opposite side. Since the respective plugs 58 planted through the plug mounting board 57 are heated by the heater disposed on the heating die 5B, the film F pressed by the compressed air is pressed against the tip face of those plugs 58 and heated.

At this time, the heating die body 55 at the outer circumference of the plug insertion holes 55c in which are inserted the respective plugs 58 has a structure in the form of a water cooled jacket inside the heating die body 55 where cooling water is supplied, wherein the film is pressed against the heating die 5B face at the outer circumference of the plug insertion holes 55c which is not heated. In this way the film F is locally heated to the prescribed temperature.

Next, the supply of compressed air from the compressed air supply routes 53 on the forming die 5A side is stopped, and compressed air is injected from the clearances formed between the outer circumferential face of the plugs 58 and the inner circumferential face of the plug insertion holes 55c. As a result, the locally heated film F is pressed toward the forming die 5A side from the heating die 5B side.

At this time, the locally heated and softened film F is extended, only at the heated portion, along the inner circumferential face of the pocket holes 52 of the forming die 5A, to form pockets. Especially, because the tip face diameter of the plugs 58 is set to be slightly larger, by approximately 1 mm or so, though not particularly restricted to this value, than the diameter at outer circumference of the pocket holes 52, the film F2 at the outer circumference of this pocket hole 52 is extended more strongly than that of the film F1 at the inner bottom part of the pocket hole 52, and the extension of the heated and softened film F becomes thicker at the inner bottom part of the pocket hole 52 than at the inner circumferential face of the pocket hole 52.

This makes it possible to prevent deformation of the inner bottom part of the pocket hole 52 even when filling tablets in the pocket holes 52.

After the pockets are formed in the film F between the forming die 5A and the heating die 5B, the two dies are separated from each other, and the next film is supplied intermittently. The pocket forming portion of the film then separates from the forming die 5A, and the next film to be formed is introduced.

To make the extension of the heated and softened film F thinner accurately and easily at the inner circumferential face of the pocket hole 52 than at the inner bottom part of the pocket hole 52, the plug mounting board 57 may be made to retreat when compressed air is injected through the gap of the plug insertion holes 55c, to make the tip face of the respective plugs 58 to separate from the film face, though not particularly restricted to this construction.

As described above, by heating the film locally only at the pocket forming portion and cooling the surrounding face, it becomes possible to prevent production of warping due to heating of the film, because no unnecessary heating is made to the film as a whole, and to place products after filling the pockets with tablets and cutting the film into sheets, mechanically upon one another.

Explanation has so far been given on the thermoforming method for film on blister packaging machines and an apparatus for carrying out this method according to the present invention, based on an embodiment thereof, but the present invention is not restricted to the construction described in the above described embodiment and its construction may be changed as required to the extent not deviating from its purpose.

According to the thermoforming method for film on blister packaging machines of the present invention, after the film is locally heated only at the pocket forming portion, compressed air is injected from the heating die side, to make the heated portion of the film extend along the inner circumferential face of the pocket holes in the forming die to form pockets, wherein no heating is performed on the portion of the film not forming pockets, thereby making it possible to form a blister sheet without warping even with the use of polypropylene film which is liable to be easily deformed with thermal contraction. The present invention also enables lap packaging of blister sheets to be performed by using an automatic machine, and enables pockets to be formed without a reduction of thickness of the sheet at the top face of the pockets, thus preventing deformation at the top face of the pockets after filling the pockets with tablets and performing blister packaging of high quality.

Moreover, by making the plugs retreat, when extending the heated portion of the film along the inner circumferential face of the pocket holes in the forming die, it is possible for the heated and softened film to separate accurately from the plugs. The compressed air injected in this state acts uniformly on the film face, thus extending the heated portion of the film accurately along the inner circumferential face of the pocket holes in the forming die, and accurately performing formation of pockets.

According to the thermoforming method for film on blister packaging machines of the present invention, a compressed air injection mechanism is disposed on the forming die side and the heating die side respectively, and in such a way that the film can be locally heated only at the pocket forming portion, by means of plugs provided in the heating die, wherein the heated portion of the film is extended along the inner circumferential face of the pocket holes in the forming die to form pockets. No heat is provided to the portion of the film not forming pockets, thereby making it possible to form blister sheets without warping even with the use of polypropylene film which is liable to be easily deformed with thermal contraction. The present invention also enables lap packaging of blister sheets to be performed by using an automatic machine, and enables pockets to be formed without a reduction of thickness of the sheet at the top face of the pockets, thus preventing deformation at the top face of the pockets after filling the pockets with tablets and performing blister packaging of high quality.

Furthermore, by forming a compressed air injection hole at the inner bottom of the pocket holes of the forming die, it becomes possible to heat the film by uniformly pressing it so as to contact the plug provided on the heating die from the forming die side, thereby forming pockets of good accuracy in beautiful shape.

Still more, by injecting compressed air through the plug insertion holes in the heating die, and constructing the heating die in a structure in the form of water cooled jacket, it becomes possible to clearly distinguish between heated portions and non heated portions of the film and form blister sheets without warping, because the non heated portions are cooled even if the heated portions are heated to such an extent as to cause softening of the film.

What is claimed is:

1. A thermoforming method for film on blister packaging machines comprising:

pinching a film, fed intermittently in synchronization with the movement of a forming die and a heating die on a thermoforming system, between the forming die and the heating die of the thermoforming system, locally heating a plurality of pocket forming portions of the film by pressing the pocket forming portions of the film into contact with the surface of a plurality of hot plugs disposed facing a plurality of pocket holes of the forming die, by injecting compressed air from the forming die side, stopping the injection of compressed air from the forming die side, injecting compressed air from the heating die side, and extending the heated pocket forming portions of said film along an inner circumferential face of the pocket holes of the forming die to form a plurality of pockets.

2. A thermoforming method for film on blister packaging machines as defined in claim 1, wherein the hot plugs retreat when the heated pocket forming portions of the film are extended along the inner circumferential face of the pocket holes of the forming die.

3. A thermoforming method for film on blister packaging machines as defined in claim 1, wherein the plurality of hot plugs are disposed on the heating die.

4. A thermoforming method for film on blister packaging machines as defined in claim 1, wherein the pocket forming portions of the film extend into the pocket holes of the forming die due solely to the injection of compressed air from the heating die side.

5. A thermoforming method for film on blister packaging machines as defined in claim 1, wherein the plurality of hot plugs are not disposed in the pocket holes of the forming die when the compressed air is injected from the heating die side.

6. A thermoforming method for film on blister packaging machines as defined in claim 1, wherein the diameter of each of the hot plugs is larger than the diameter of each of the pocket holes.

7. A thermoforming system for film on blister packaging machines comprising:
a forming die and a heating die operable to move so as to pinch and heat a film that is fed intermittently between the forming die and the heating die of the thermoforming system,
wherein said heated film is partially extended along an inner circumferential face of a plurality of pocket holes of the forming die to form a plurality of pockets,
wherein the heating die is provided with plugs for locally heating only a plurality of pocket forming portions of the film disposed facing the pocket holes of the forming die, and
a first injecting mechanism and a second injecting mechanism that inject compressed air, the first and second injecting mechanisms disposed on the forming die side and the heating die side, respectively.

8. A thermoforming system for film on blister packaging machines as defined in claim 7, further comprising a compressed air injection hole formed at the inner bottom portion of the pocket holes of the forming die.

9. A thermoforming system for film on blister packaging machines as defined in claim 8, further comprising a plurality of plug insertion holes formed in the heating die through which compressed air is injected, wherein the heating die is constructed in the form of a water cooled jacket.

10. A thermoforming system for film on blister packaging machines as defined in claim 7, further comprising a plurality of plug insertion holes formed in the heating die through which compressed air is injected, wherein the heating die is constructed in the form of a water cooled jacket.

11. A thermoforming system for film on blister packaging machines as defined in claim 7, wherein the pocket forming portions of the film extend into the pocket holes of the forming die due solely to the injection of compressed air from the heating die side.

12. A thermoforming system for film on blister packaging machines as defined in claim 7, wherein the plurality of plugs are not disposed in the pocket holes of the forming die when the compressed air is injected from the heating die side.

13. A thermoforming system for film on blister packaging machines as defined in claim 7, wherein the diameter of each of the plugs is larger than the diameter of each of the pocket holes.

14. A thermoforming system for film on blister packaging machines, comprising:
a forming die having a plurality of pocket holes to form a plurality of pockets in the film;
a heating die having a plurality of plugs for locally heating only pocket forming portions of the film when facing said pocket holes of said forming die;
a first injecting mechanism disposed on a forming die side and operable to inject compressed air to press the film in contact with said plugs; and
a second injecting mechanism disposed on a heating die side and operable to inject compressed air to extend the heated film along an inner circumferential face of said pocket holes of said forming die.

15. A thermoforming system for film on blister packaging machines as defined in claim 14, wherein the pocket forming portions of the film extend into the pocket holes of the forming die due solely to the injection of compressed air from the heating die side.

16. A thermoforming system for film on blister packaging machines as defined in claim 14, wherein the plurality of plugs are not disposed in the pocket holes of the forming die when the compressed air is injected from the heating die side.

17. A thermoforming system for film on blister packaging machines as defined in claim 14, wherein the diameter of each of the plugs is larger than the diameter of each of the pocket holes.

* * * * *